(12) United States Patent
Axelrod et al.

(10) Patent No.: US 11,317,692 B2
(45) Date of Patent: May 3, 2022

(54) ADJUSTABLE NAIL TRIMMER

(71) Applicant: FOUR PAWS PRODUCTS, LTD., Neptune City, NJ (US)

(72) Inventors: Glen S. Axelrod, Colts Neck, NJ (US); Ajay Gajria, Maharashtra (IN); Diana M. Echeverri, Beachwood, NJ (US)

(73) Assignee: FOUR PAWS PRODUCTS, LTD., Neptune City, NJ (US)

( * ) Notice: Subject to any disclaimer, the term of this patent is extended or adjusted under 35 U.S.C. 154(b) by 40 days.

(21) Appl. No.: 16/914,787

(22) Filed: Jun. 29, 2020

(65) Prior Publication Data
US 2021/0401145 A1    Dec. 30, 2021

(51) Int. Cl.
*A01K 13/00* (2006.01)
*A45D 29/02* (2006.01)

(52) U.S. Cl.
CPC .............. *A45D 29/02* (2013.01); *A01K 13/00* (2013.01)

(58) Field of Classification Search
CPC ....... A01K 13/00; A45D 29/02; B23D 29/023
See application file for complete search history.

(56) References Cited

U.S. PATENT DOCUMENTS

| | | | |
|---|---|---|---|
| 3,838,507 A | 10/1974 | Clark | |
| 4,228,585 A * | 10/1980 | Nelson | A45D 29/02 30/29 |
| 4,956,915 A | 9/1990 | Anderson | |
| 4,982,747 A | 1/1991 | Shah | |
| 5,533,262 A | 7/1996 | Clark | |
| 6,557,259 B1 | 5/2003 | Nguyen | |
| 10,506,796 B1 * | 12/2019 | Lee | A01K 17/00 |
| 2004/0205968 A1 * | 10/2004 | Choi | A45D 29/02 30/28 |
| 2005/0132975 A1 | 6/2005 | Huggans | |

(Continued)

FOREIGN PATENT DOCUMENTS

| | | |
|---|---|---|
| CN | 104544900 | 4/2015 |
| JP | 6459117 B2 * | 1/2019 |
| KR | 20180062085 A * | 6/2018 |

OTHER PUBLICATIONS

International Search Report and Written Opinion from related PCT Appln. No. PCT/US2019/033041, dated Aug. 5, 2019.

(Continued)

*Primary Examiner* — Son T Nguyen
(74) *Attorney, Agent, or Firm* — Grossman, Tucker, Perreault & Pfleger, PLLC

(57) ABSTRACT

The present disclosure is generally directed to trimming shears for cutting (or trimming) a claw of a domesticated animal. The trimming shears include a first handle, a second handle, and at least one blade. Pivotal movement of the first handle relative to the second handle urges the blade between a pre-cut position and a cut position. The transition from the pre-cut position to the cut position being configured to cut a claw positioned in the blade path. The trimming shears may further include a guide for receiving a respective claw and guiding the claw to be positioned within the blade path. In one example, the guide may include a single aperture, wherein an effective opening area of the aperture is adjustable to accommodate a respective claw. In another example, the guide may include a plurality of apertures, each sized for receiving a respective claw size.

20 Claims, 7 Drawing Sheets

(56) References Cited

U.S. PATENT DOCUMENTS

2007/0137041 A1   6/2007  Manheimer et al.
2009/0056732 A1   3/2009  Drelinger
2017/0318785 A1  11/2017  Levy et al.

OTHER PUBLICATIONS

International Search Report and Written Opinion from corresponding PCT Appln No. PCT/US21/70779, dated Nov. 9, 2021.

\* cited by examiner

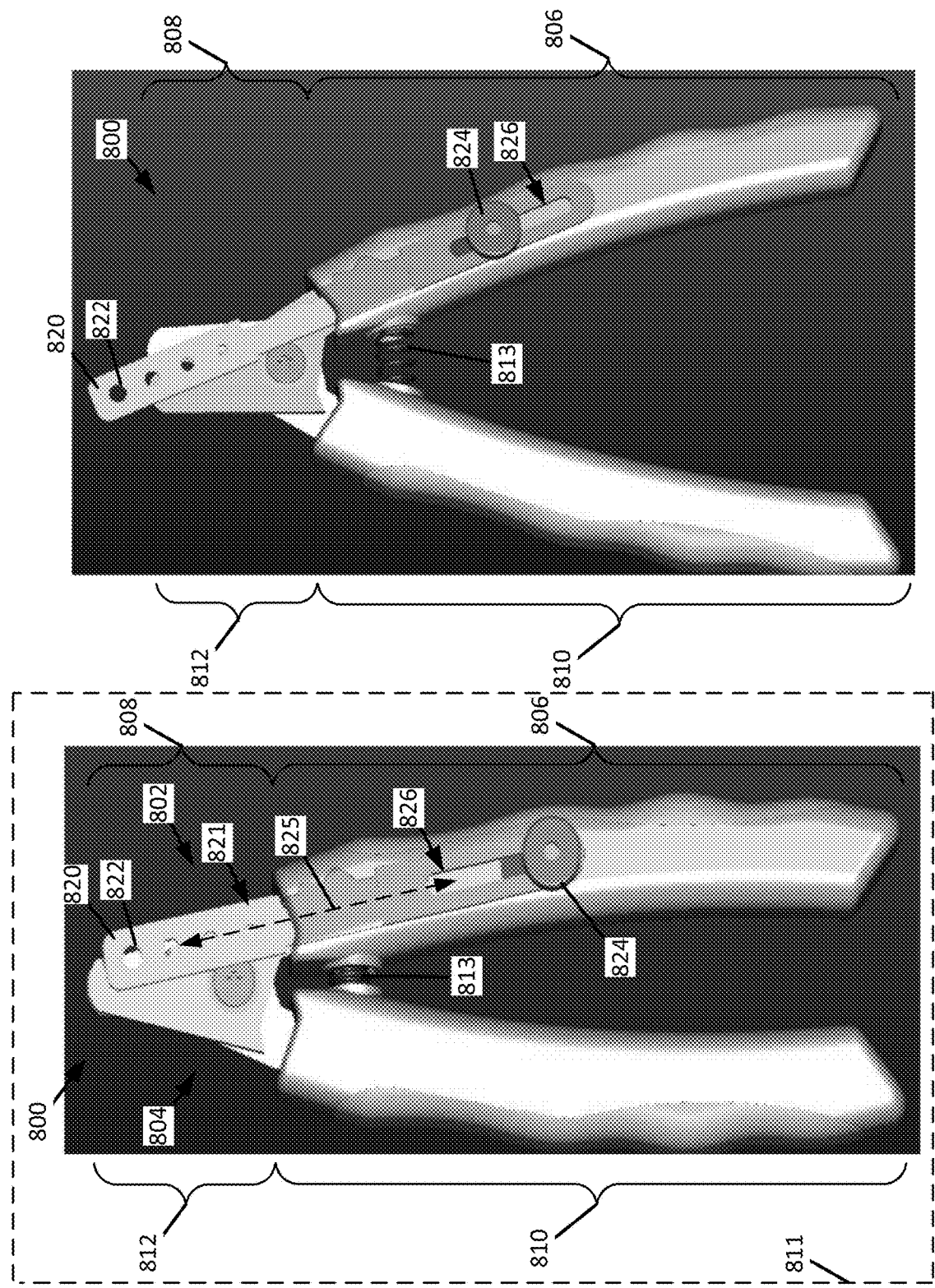

ADJUSTABLE NAIL TRIMMER

FIELD

The present disclosure is generally directed to grooming tools for animals and more specifically to nail trimmers for an animal having one or more claws.

BACKGROUND

Domesticated animals having one or more claws may have difficulty maintaining the claws at a comfortable length. As such, in some instances, an owner of the domesticated animal may provide a device to the animal that the animal can use to naturally maintain their claws. For example, for a feline, the owner may provide a scratch post such that the feline can naturally wear the claw length down to a comfortable length through use of the scratch post.

In other instances, the owner may become actively involved in maintaining a length of the domesticated animal's claws. For example, the owner may cut the claws using a pair of trimming shears. While cutting the claws using shears, the owner may accidentally harm the animal if proper care is not exercised. For example, cutting a claw too short may cause physical pain to the domesticated animal and potentially result in bleeding (also referred to as cutting the quick).

As such, some shears are capable of detecting and indicating a safe cutting length such that the owner does not cut the quick of the domesticated animal. However, the domesticated animal may struggle during the claw trimming process and the owner may still cut the claw too short accidentally. As such, some shears may include a physical stop that prevents the claw from being cut too short. However, given variability amongst the claws of domesticated animals and/or the frequency of cutting the claws, the physical stop may not be equally effective for all domesticated animals (e.g., a user may still cut the quick of their domesticated animal accidentally).

SUMMARY

An example of trimming shears for cutting one or more claws of an animal may include a body defining a first handle, a second handle, a guide, a blade, and an indexer. The second handle may be pivotally coupled to the body, wherein the second handle pivots relative to the first handle in a handle plane. The guide may extend from the body and define an aperture for receiving a respective one of the one or more claws of the animal. The blade may extend within a blade plane and be configured to be urged within the blade plane along a blade path between a pre-cut position and a cut position in response to pivotal movement of the second handle relative to the first handle, wherein the blade plane extends transverse to the handle plane. The indexer may be configured to adjust the pre-cut position of the blade relative to the aperture such that a maximum insertion distance of the respective claw within the aperture is at least partially defined by the pre-cut position of the blade.

Another example of trimming shears for cutting one or more claws of an animal may include a body defining a first handle, a second handle, a guide, a blade, and an indexer. The second handle may be pivotally coupled to the body, wherein the second handle pivots relative to the first handle in a handle plane. The guide may extend from the body and define an aperture for receiving a respective one of the one or more claws of the animal, the aperture having a circular shape. The blade may extend within a blade plane and define a cutting edge having an arcuate shape, the blade may be configured to be urged within the blade plane along a blade path between a pre-cut position and a cut position in response to pivotal movement of the second handle relative to the first handle, wherein the blade plane extends perpendicular to the handle plane. The indexer may be configured to adjust the pre-cut position of the blade relative to the aperture such that a maximum insertion distance of the respective claw within the aperture is at least partially defined by the pre-cut position of the blade, the indexer including an indicator configured to provide an indication of an effective opening area of the aperture.

Another example of trimming shears for cutting one or more claws of an animal may include a first body, a second body, and a guide. The first body may have a first handle portion and a first cutting portion. The second body may have a second handle portion and a second cutting portion. A cutting region may be defined between the first and second cutting portions. The second body may be pivotally coupled to the first body such that the first handle portion, the first cutting portion, the second handle portion, and the second cutting portion pivot in a common plane. The guide may be slidably coupled to the first body and configured to slide linearly along a sliding axis that extends substantially parallel to the common plane. The guide may include a receiving surface that is substantially parallel to the common plane, a blade facing surface that is opposite the receiving surface and substantially parallel to the common plane, and a plurality of apertures. The plurality of apertures may extend from the receiving surface and through the blade facing surface. The plurality of apertures may be configured to receive a respective one of the one or more claws.

BRIEF DESCRIPTION OF THE DRAWINGS

These and other features and advantages will be better understood by reading the following detailed description, taken together with the drawings, wherein:

FIG. 8 shows a top view of example trimming shears in a cut position, consistent with embodiments of the present disclosure.

FIG. 9 shows a top view of the trimming shears of FIG. 8 in a pre-cut position, consistent with embodiments of the present disclosure.

DETAILED DESCRIPTION OF PREFERRED EMBODIMENTS

The present disclosure is generally directed to trimming shears for cutting (or trimming) a claw of a domesticated animal. The trimming shears include a first handle, a second handle, and at least one blade. Pivotal movement of the first handle relative to the second handle urges the blade between a pre-cut position and a cut position. The transition from the pre-cut position to the cut position being configured to cut a claw positioned in the blade path. The trimming shears may further include a guide for receiving a respective claw and guiding the claw to be positioned within the blade path. In one example, the guide may include a single aperture, wherein an effective opening area of the aperture is adjustable to accommodate a respective claw. In another example, the guide may include a plurality of apertures, each sized for receiving a respective claw size. As such, the guide may generally be described as reducing a risk of accidentally cutting the quick when cutting the claw.

Figure 1A:
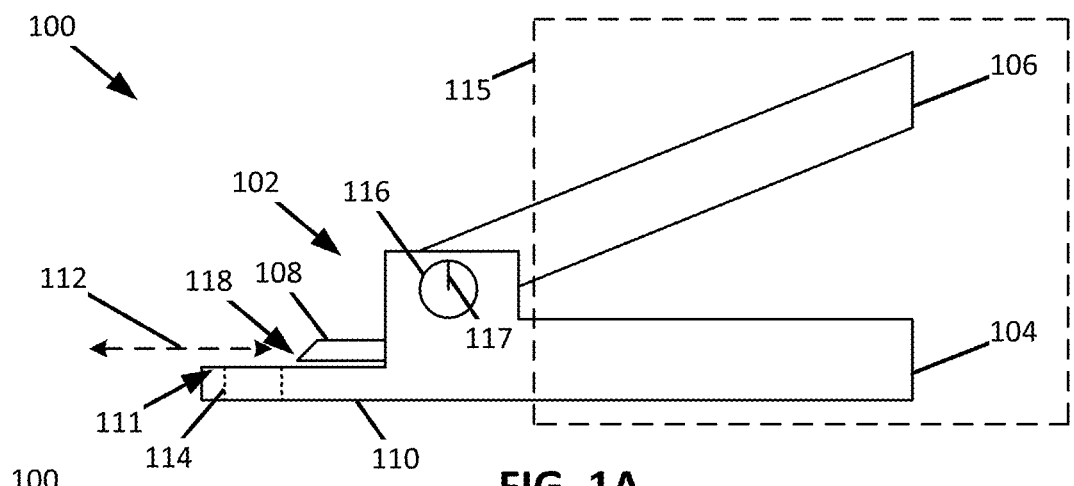
FIG. 1A shows a schematic side view of an example of trimming shears for cutting a claw of a domesticated animal in a pre-cut position, consistent with embodiments of the present disclosure.
Figure 1B:
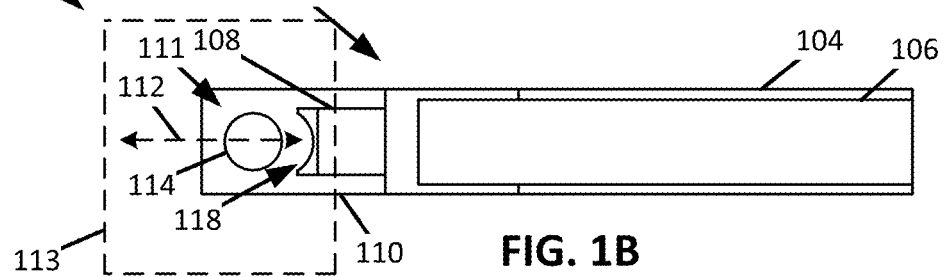
FIG. 1B shows a schematic top view of the trimming shears of FIG. 1A, consistent with embodiments of the present disclosure.
Figure 2A:
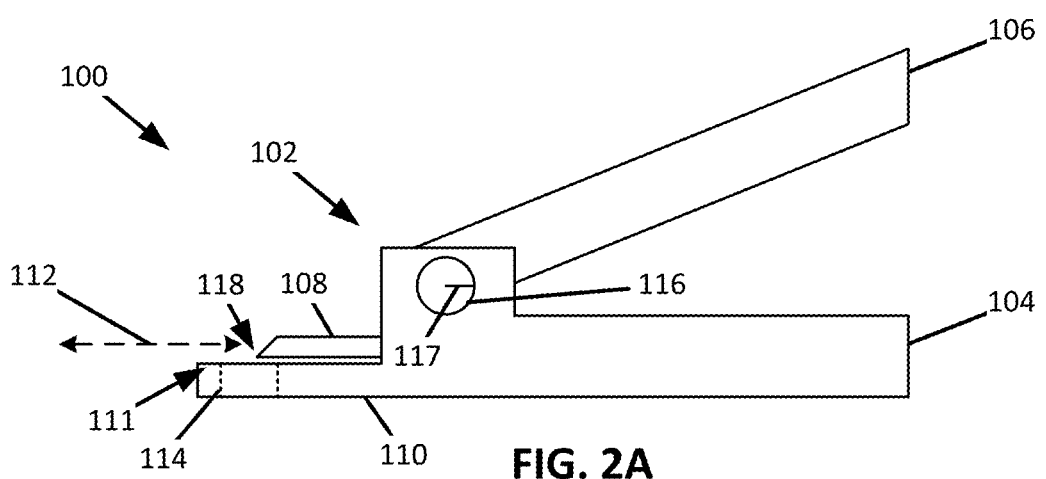
FIG. 2A shows a schematic side view of the trimming shears of FIG. 1A in another pre-cut position, consistent with embodiments of the present disclosure.
Figure 2B:
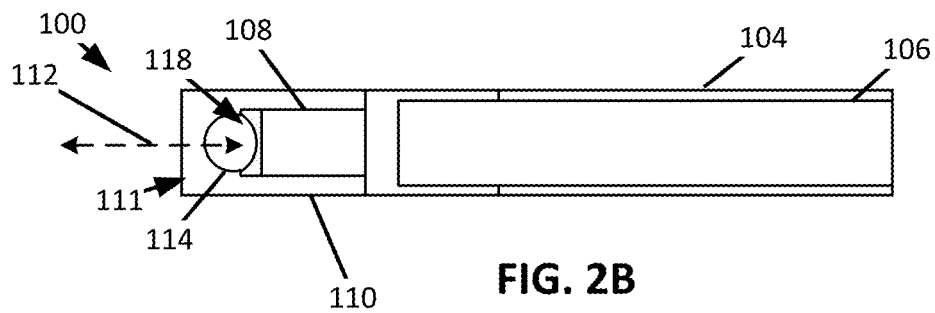
FIG. 2B shows a schematic top view of the trimming shears of FIG. 2A, consistent with embodiments of the present disclosure.
Figure 3A:
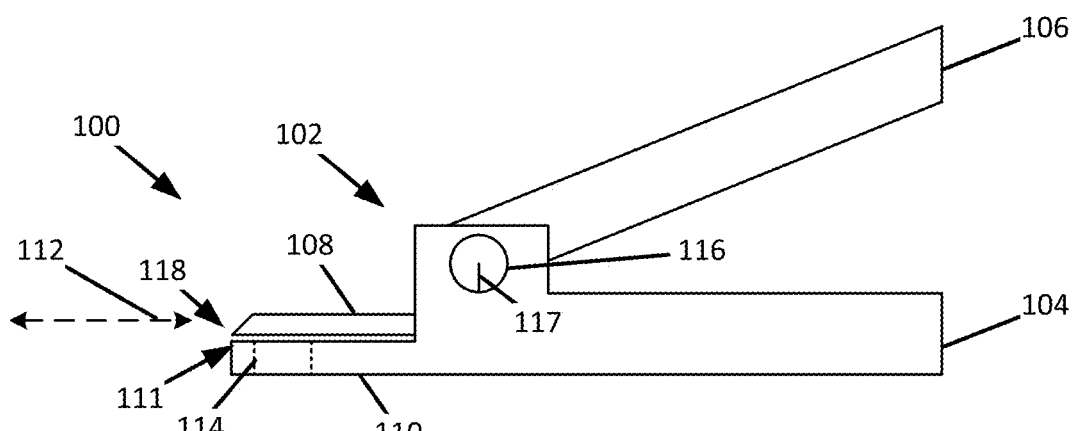
FIG. 3A shows a schematic side view of the trimming shears of FIG. 1A in a cut position, consistent with embodiments of the present disclosure.
Figure 3B:
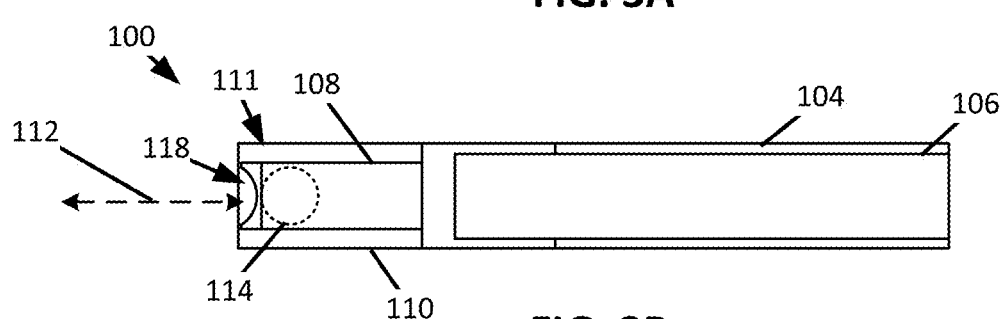
FIG. 3B shows a schematic top view of the trimming shears of FIG. 3A, consistent with embodiments of the present disclosure.
Figures 4A, 4B, 4C, 4D:
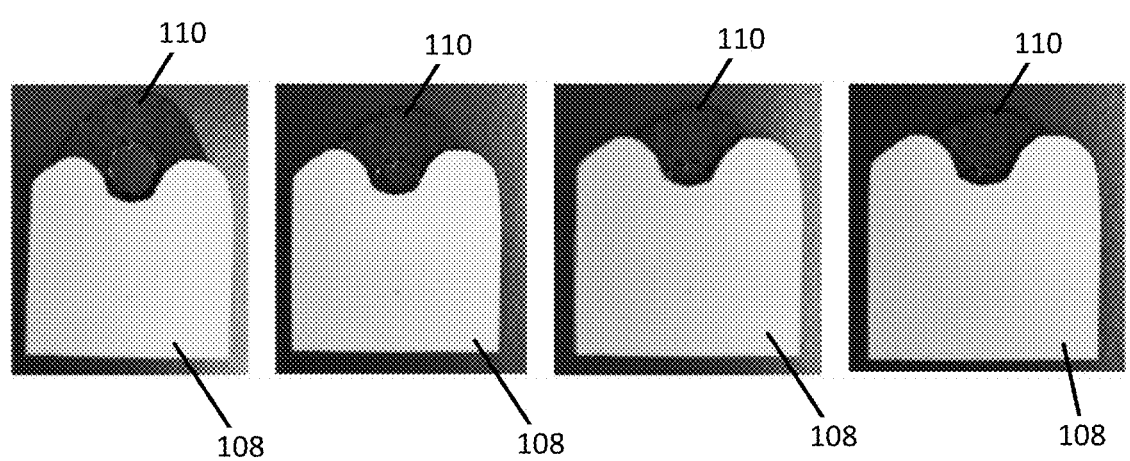
FIG. 4A shows an example of a cutting blade of the trimming shears of FIG. 1A in a first pre-cut position, consistent with embodiments of the present disclosure.
FIG. 4B shows an example of a cutting blade of the trimming shears of FIG. 1A in a second pre-cut position, consistent with embodiments of the present disclosure.
FIG. 4C shows an example of a cutting blade of the trimming shears of FIG. 1A in a third pre-cut position, consistent with embodiments of the present disclosure.
FIG. 4D shows an example of a cutting blade of the trimming shears of FIG. 1A in a fourth pre-cut position, consistent with embodiments of the present disclosure.

FIGS. 1-3 show a schematic example of trimming shears 100. The trimming shears 100 include a body 102 defining a first handle 104, a second handle 106 pivotally coupled to the body 102, a blade 108, and a guide 110 extending from the body 102. The guide 110 defines an aperture 114 for receiving at least a portion of a claw of an animal. Pivotal movement of the second handle 106 relative to the first handle 104 urges the blade 108 along a blade path 112 between a pre-cut position (e.g., as shown in FIGS. 1 and 2) and a cut position (e.g., as shown in FIG. 3). The blade path 112 extends in a blade plane 113 such that the blade 108 moves linearly in the blade plane 113 and parallel to a top surface 111 of the guide 110. The blade plane 113 extends transverse to (e.g., perpendicular to) a handle plane 115. The handle plane 115 extends through the first and second handle 104 and 106 such that the pivotal movement of the first and/or second handles 104 and 106 occurs in the handle plane 115.

When in the pre-cut position, the blade 108 is positioned along the guide 110 such that a claw received within the aperture 114 is not in cutting contact with the blade 108 (e.g., the blade 108 may be in contact with the claw but has not penetrated the claw). In some instances, when the blade 108 is in the pre-cut position, the blade 108 may partially obscure the aperture 114 (e.g., as shown in FIG. 2). As such, when the blade 108 is in the pre-cut position, a maximum insertion distance of the claw within the aperture 114 may be at least partially defined by the pre-cut position of the blade 108. In other words, an effective opening area of the aperture 114 (e.g., the opening area of the aperture 114 capable of receiving a claw) may be adjusted through adjusting the pre-cut position of the blade 108 relative to the aperture 114.

The trimming shears 100 may include an indexer 116 configured to adjust the pre-cut position of the blade 108 relative to the aperture 114. For example, the indexer 116 can be configured to adjust the pre-cut position of the blade 108 such that the blade 108 partially obscures the aperture 114 when in the pre-cut position. As such, the indexer 116 can generally be described as adjusting a maximum insertion distance of a claw within the aperture 114. In other words, a maximum insertion distance of the claw within the aperture 114 is at least partially defined by the pre-cut position of the blade 108. In some instances, the indexer 116 may include an indicator 117 that is configured to provide an indication of the maximum insertion distance for a respective pre-cut position. For example, the indicator 117 may be configured to provide an indication of the effective opening area of the aperture 114 for a respective pre-cut position of the blade 108. In other words, the indicator 117 may provide an indication of an amount of overlap between the blade 108 and the aperture 114 for a respective pre-cut position (e.g., using a numerical scale). In some instances, the indexer 116 can be configured to adjust the blade 108 between two or more predetermined pre-cut positions. For example, the indexer 116 can be configured to adjust the blade 108 between at least four predetermined pre-cut positions (see, e.g., FIGS. 4A-4D showing an example of the blade 108 being adjusted between four different predetermined pre-cut positions along the guide 110). Alternatively, the indexer 116 can be configured such the pre-cut position of the blade 108 can generally be described as being infinitely adjustable.

In some instances, the indexer 116 can be configured to be rotated by a user. Rotation of the indexer 116 may cause the blade 108 to move relative to the guide 110 and along the blade path 112 such that the pre-cut position is adjusted. In other words, rotation of the indexer 116 may cause a corresponding linear movement of the blade 108, adjusting the pre-cut position of the blade 108. For example, the indexer 116 may include a gear configured to engage a corresponding rack coupled to or defined by the blade 108 such that rotation of the indexer 116 causes a corresponding linear movement of the blade 108. By way of further example, the indexer 116 may include a cam configured to engage (directly or indirectly) a portion of the blade 108 such that rotation of the indexer 116 causes a corresponding linear movement of the blade 108. Additionally, or alternatively, the pre-cut position may be adjusted through the pivotal movement of the second handle 106 relative to the first handle 104. For example, when the blade 108 is at the desired pre-cut position after the pivotal movement, the indexer 116 can be actuated such that the pre-cut position is adjusted to the current position of the blade 108. In this example, the indexer 116 can be configured to be depressed and actuate a blade lock. Actuation of the blade lock adjusts the pre-cut position to the current position of the blade 108.

As shown, the blade 108 defines a cutting edge 118 having an arcuate shape (e.g., a semi-circular or semi-elliptical shape). The arcuate shape may generally correspond to the shape of a claw. As such, when the pre-cut position of the blade 108 is adjusted, the exposed area of the aperture 114 has a generally arcuate shape (e.g., a circular or elliptical shape). This may allow for an improved adjustment of the maximum insertion distance of a respective claw when compared to a configuration where the cutting edge 118 has a linear shape.

As shown, the aperture 114 may have a circular shape. A circular shape may allow for a greater variability of claw sizes to be received within the aperture 114 when the pre-cut position of the blade 108 is adjustable (e.g., when compared to an example where the aperture 114 has an elliptical shape). However, the aperture 114 may have any shape including, for example, an elliptical shape.

Figure 5:
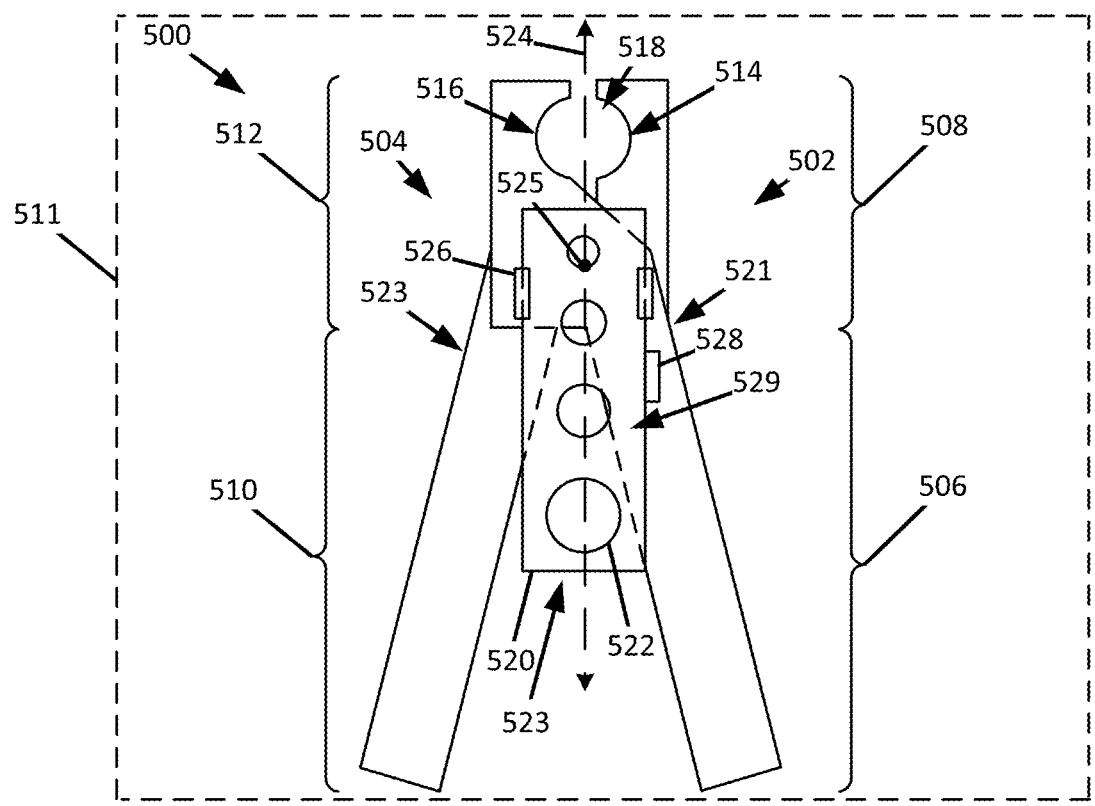
FIG. 5 shows a schematic top view of an example of trimming shears for cutting a claw of a domesticated animal having a guide in a storage position, consistent with embodiments of the present disclosure.
Figure 6:
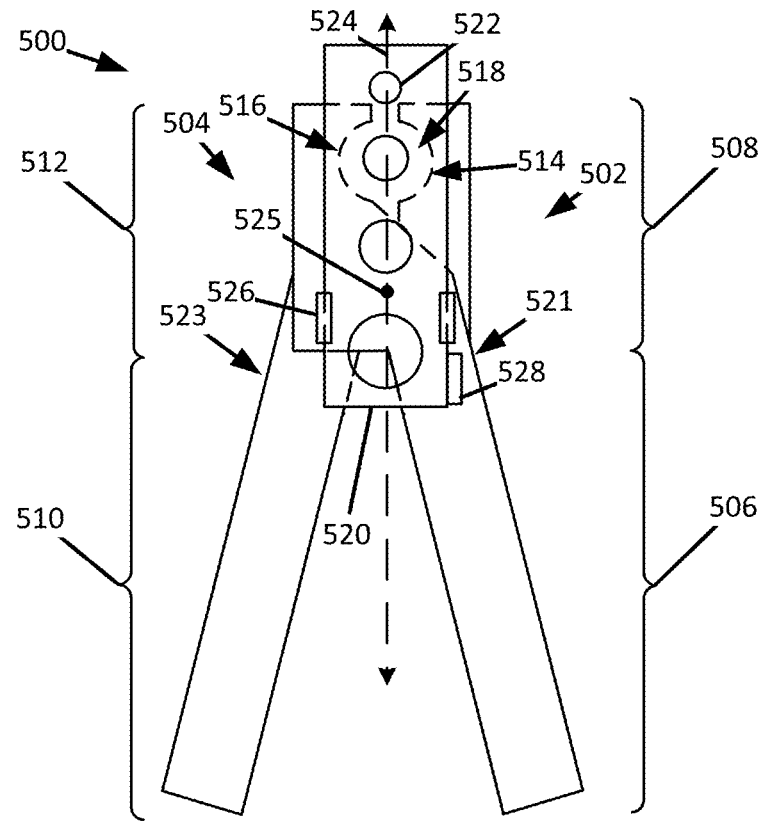
FIG. 6 shows another schematic top view of the trimming shears of FIG. 5, wherein the guide is in a use position, consistent with embodiments of the present disclosure.

FIGS. 5 and 6 show a schematic example of trimming shears 500. The trimming shears 500 include a first body 502 and a second body 504. The first body 502 includes a first handle portion 506 and a first cutting portion 508. The second body 504 includes a second handle portion 510 and a second cutting portion 512. The first body 502 is pivotally coupled to the second body 504 such that, when the first and second handle portions 506 and 510 are pivoted towards each other, the first and second cutting portions 508 and 512 are pivoted towards each other. As shown, the handle portions 506 and 510 and the cutting portions 508 and 512 pivot in a common plane 511. The first and second cutting portions 508 and 512 each define a corresponding cutting edge 514 and 516. One or more of the cutting edges 514 and/or 516 may have an arcuate shape. The first and second cutting edges 514 and 516 define a cutting region 518 therebetween. In other words, the cutting region 518 can generally be described as being defined between the first and second cutting portions 508 and 512. The cutting region 518 is configured to receive a claw such that, when the cutting edges 514 and 516 are transitioned from a pre-cut position to a cut position, a claw positioned therein is cut.

The trimming shears 500 include a guide 520 having a receiving (or top) surface 529, a blade facing (or bottom) surface opposite the receiving surface 529, and a plurality of apertures 522 extending from the receiving surface 529 and through the blade facing surface. The blade facing surface and the receiving surface 529 are substantially parallel to (e.g., within 5°, 4°, 3°, 2°, or 1° of parallel) the common plane 511.

Figure 7:
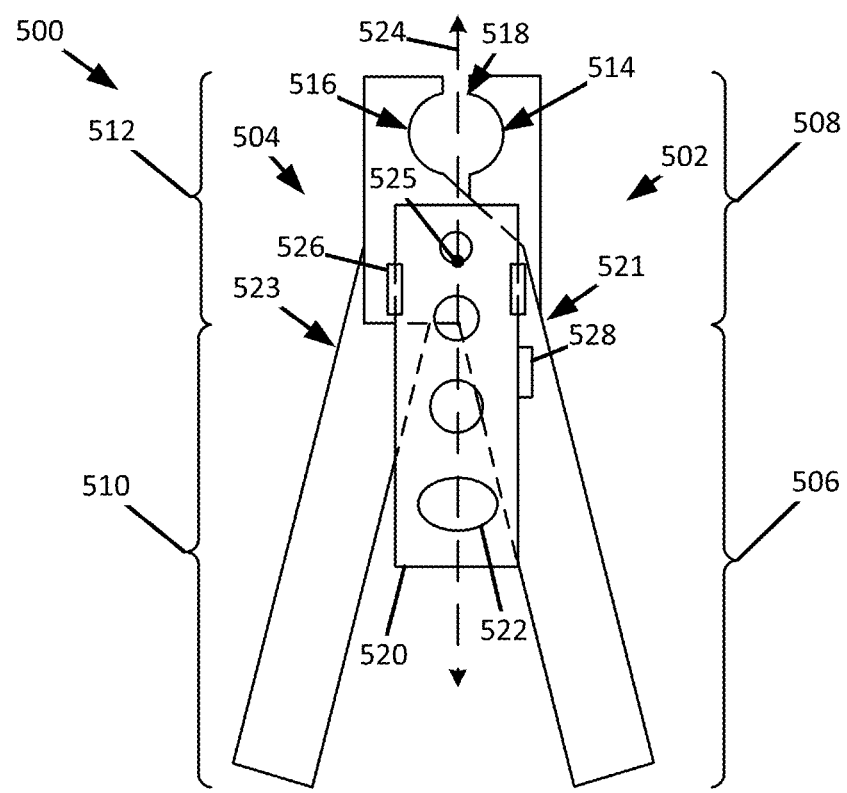
FIG. 7 shows a schematic top view of an example of the trimming shears of FIG. 5, wherein the guide includes at least one non-circular aperture, consistent with embodiments of the present disclosure.

The apertures 522 are configured to receive a claw of an animal therein. For example, the guide 520 may include at least four apertures 522. The guide 520 may be configured to be transitioned between a storage position (e.g., as shown in FIG. 5) and a use position (e.g., as shown in FIG. 6). When in the use position, at least a portion of the guide 520 is configured to extend over the cutting region 518 such that at least one aperture 522 can be aligned with (e.g., centrally aligned with) the cutting region 518. Each of the apertures 522 has a different size, wherein each size is configured to limit a maximum insertion distance of a claw inserted therein. As such, the size of the apertures 522 may be based on a claw size for various animals and/or animals of different sizes. For example, and as shown, the guide 520 may include four apertures 522 arranged according to size from largest to smallest. In some instances, and as shown, each of the apertures 522 may have a circular shape. In other instances, at least one of the apertures 522 may have a non-circular shape. For example, as shown in FIG. 7, at least one aperture 522 may have an elliptical shape. The apertures 522 may include a tapered region extending around a perimeter of the apertures 522 such that a central cross-section of at least a portion of each of the apertures 522 is frustoconical. Such a configuration may allow for a claw to be more easily inserted therein.

The guide 520 is slidably coupled to one of the first or second bodies 502 or 504 such that a position of the guide 520, relative to the cutting region 518, can be adjusted. For example, the guide 520 can be slid along the first or second bodies 502 or 504 such that an aperture 522 having a size that corresponds to a claw of an animal to be trimmed is aligned with the cutting region 518. As shown, the guide 520 is configured to slide parallel to a sliding axis 524. The sliding axis 524 can extend substantially parallel to the common plane 511. For example, the guide 520 can be configured to slide along the sliding axis 524 and along (e.g., substantially parallel to) a top surface 521 or 523 of a respective one of the first or second bodies 502 or 504. The top surfaces 521 and 523 of the first and second bodies 502 and 504 may generally be described as the surface of the first and second bodies 502 and 504 that face an animal when inserting a claw into the aperture 522. The sliding axis 524 extends between the first and second handle portions 506 and 510, through a pivot point 525 of the first and second bodies 502 and 504, and between the first and second cutting portions 508 and 512.

The guide 520 is configured to slide linearly along the sliding axis 524. For example, the first body 502 may include a plurality of rails 526 configured to slidably receive the guide 520 therein. In other words, the guide 520 is slidably coupled to the first body 502 using the rails 526. The guide 520 can be configured to form an interference fit with the rails 526 such that movement of the guide 520 within the rails 526 requires exertion of a predetermined amount of force. Additionally, or alternatively, the trimming shears 500 may include an indexer 528 coupled to the first body 502 or the second body 504 and configured to releasably engage a portion of the guide 520. The indexer 528 is configured to retain the guide 520 at a predetermined position. For example, the indexer 528 may include a cam configured to exert a clamping force on the guide 520 such that the guide 520 is retained in a desired position. By way of further example, the indexer 528 may include one or more teeth configured to engage corresponding recesses in the guide 520 such that the guide 520 is retained in a desired position. In some instances, the indexer 528 may include a gear configured to engage a corresponding rack coupled to or defined by the guide 520 such that rotational movement of the gear causes a corresponding linear movement of the guide 520.

In some instances, the guide 520 may be removable from the rails 526. Removal of the guide 520 from the rails 526 allows the guide 520 to be inserted into the rails 526 in a reverse orientation. For example, for a guide 520 having four apertures 522 arranged by size, in a first orientation the smallest two apertures 522 may be capable of being aligned with the cutting region 518 and, when the orientation is reversed to a second orientation, the largest two apertures 522 may be capable of being aligned with the cutting region 518. Such a configuration may allow an overall longitudinal length of the guide 520 to be shortened.

Figure 10:
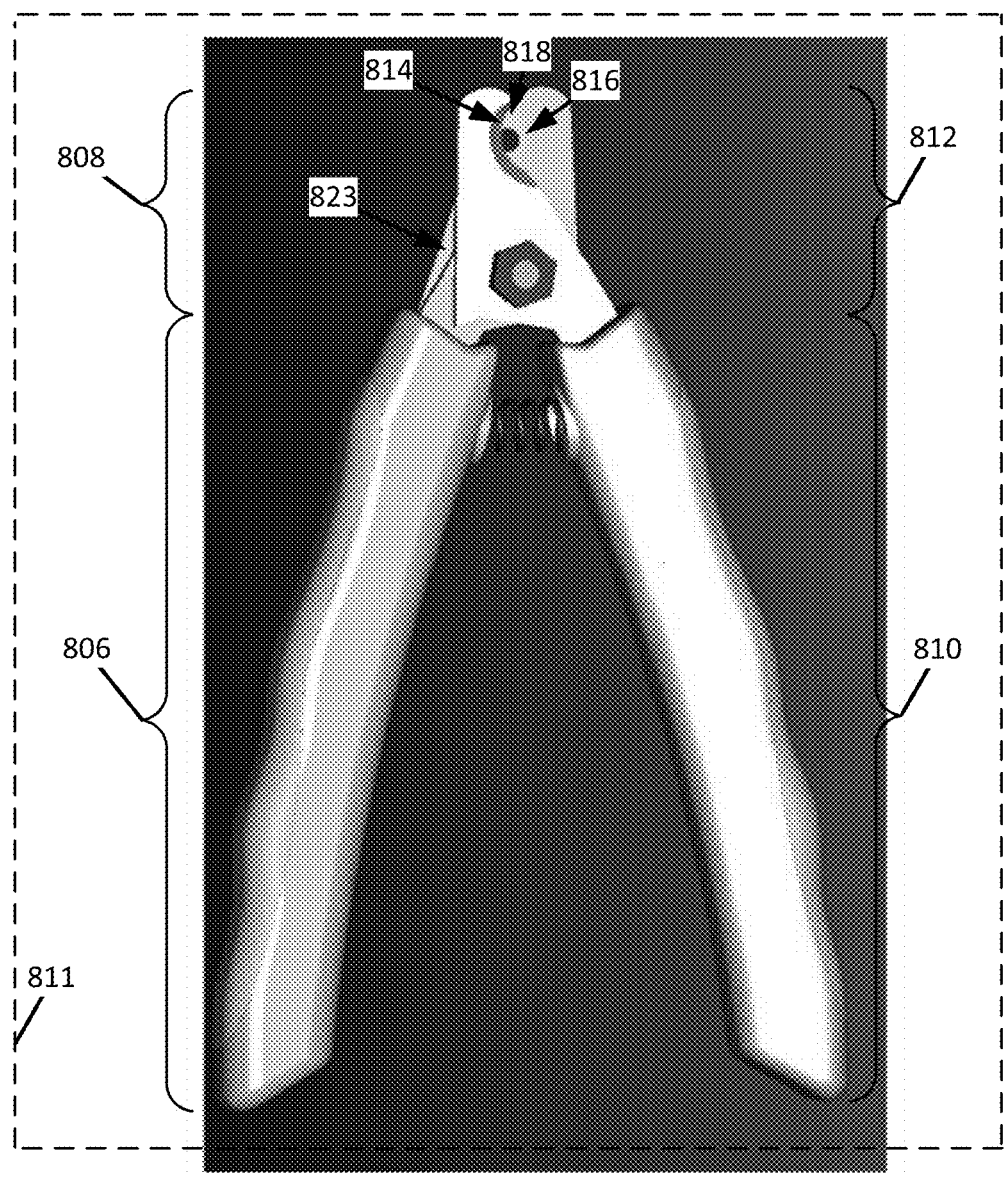
FIG. 10 shows a bottom view of the trimming shears of FIG. 8 in a pre-cut position, consistent with embodiments of the present disclosure.

FIG. 8 shows a top view of example trimming shears 800 in a cut position, FIG. 9 shows a top view of the trimming shears 800 in a pre-cut position, and FIG. 10 shows a bottom view of the trimming shears 800 in a pre-cut position. The trimming shears 800 include a first body 802 and a second body 804. The first body 802 includes a first handle portion 806 and a first cutting portion 808. The second body 804 includes a second handle portion 810 and a second cutting portion 812. The first body 802 is pivotally coupled to the second body 804 such that, when the first handle portion 806 is pivoted towards the second handle portion 810, the first cutting portion 808 pivots towards the second cutting portion 812. In other words, the first and second bodies 802 and 804 transition between cut and pre-cut positions in response to pivotal movement. A biasing mechanism 813 (e.g., a spring) may be disposed between the first and second bodies 802 and 804 such that biasing mechanism 813 urges the first and second bodies 802 and 804 towards the pre-cut position.

As shown, the first handle portion 806, the first cutting portion 808, the second handle portion 810, and the second cutting portion 812 pivot in a common plane 811. The first and second cutting portions 808 and 812 each define corresponding cutting edges 814 and 816. The cutting edges 814 and 816 may have an arcuate shape. A cutting region 818 is defined between the first and second cutting edges 814 and 816. In other words, the cutting region 818 can generally be described as being defined between the first and second cutting portions 808 and 812. The cutting region 818 is configured to receive a claw therein. When a claw is received within the cutting region 818, the cutting edges 814 and 816 are configured to cut the claw in response to the pivotal movement of the first and second handle portions 806 and 810. In other words, a claw positioned within the cutting region 818 is cut in response to the trimming shears 800 being transitioned from the pre-cut position to the cut position.

The trimming shears 800 include a guide 820 slidably coupled to the first body 802 or the second body 804. The guide 820 has a receiving (or top) surface 821, a blade facing (or bottom) surface 823 opposite the receiving surface 821, and a plurality of apertures 822 extending from the receiving surface 821 and through the blade facing surface 823. The blade facing surface and the receiving surface 821 and 823 are substantially parallel to (e.g., within 5°, 4°, 3°, 2°, or 1° of parallel) the common plane 811.

The apertures 822 are configured to receive a claw of an animal therein. For example, the guide 820 may include at least four apertures 822, each aperture 822 having a different opening size (e.g., diameter). In some instances, the apertures 822 may be arranged according to opening size (e.g., from smallest to largest). Each opening size can correspond to a maximum insertion distance of a claw received therein. For example, a diameter of each of the apertures 822 may measure in range of 0.5 millimeter (mm) to 6.5 mm. By way of further example, a first aperture 822 may have a diameter measuring 2 mm, a second aperture 822 may have a diameter measuring 2.5 mm, a third aperture 822 may have a diameter measuring 3 mm, and a fourth aperture 822 may have a diameter measuring 3.5 mm. By way of still further example, a first aperture 822 may have a diameter measuring 4 mm, a second aperture 822 may have a diameter measuring 4.5 mm, a third aperture 822 may have a diameter measuring 5 mm, and a fourth aperture 822 may have a diameter measuring 5.5 mm. By way of still further example, a first aperture 822 may have a diameter measuring 1.5 mm, a second aperture 822 may have a diameter measuring 2 mm, a third aperture 822 may have a diameter measuring 2.5 mm, and a fourth aperture 822 may have a diameter measuring 3 mm.

In some instances, a measure of a difference in diameter between immediately adjacent apertures 822 may be at least 0.5 mm. For example, a first aperture 822 may have a diameter that measures 1.5 mm and a second, immediately adjacent, aperture 822 may have a diameter that measures 2 mm. While the guide 820 is shown as having four apertures 822, the guide 820 may have any number of apertures 822. For example, the guide 820 may have at least two apertures 822, at least three apertures 822, or any other number of apertures 822.

The guide 820 is configured to be slidable relative to the cutting region 818 such that a respective aperture 822 may be aligned (e.g., centrally aligned) with the cutting region 818. For example, the guide 820 can be configured to slide linearly along a sliding axis 825 that extends substantially parallel to the common plane 811.

In some instances, the guide 820 can be configured to be slidably coupled to the first handle portion 806 of the first body 802. For example, the guide 820 can be slidably received within the first handle portion 806. As shown, an actuator 824 extends from a slot 826 extending along the first handle portion 806, wherein movement of the actuator 824 relative to the slot 826 causes a corresponding movement of the guide 820 relative to the cutting region 818.

Figure 11:
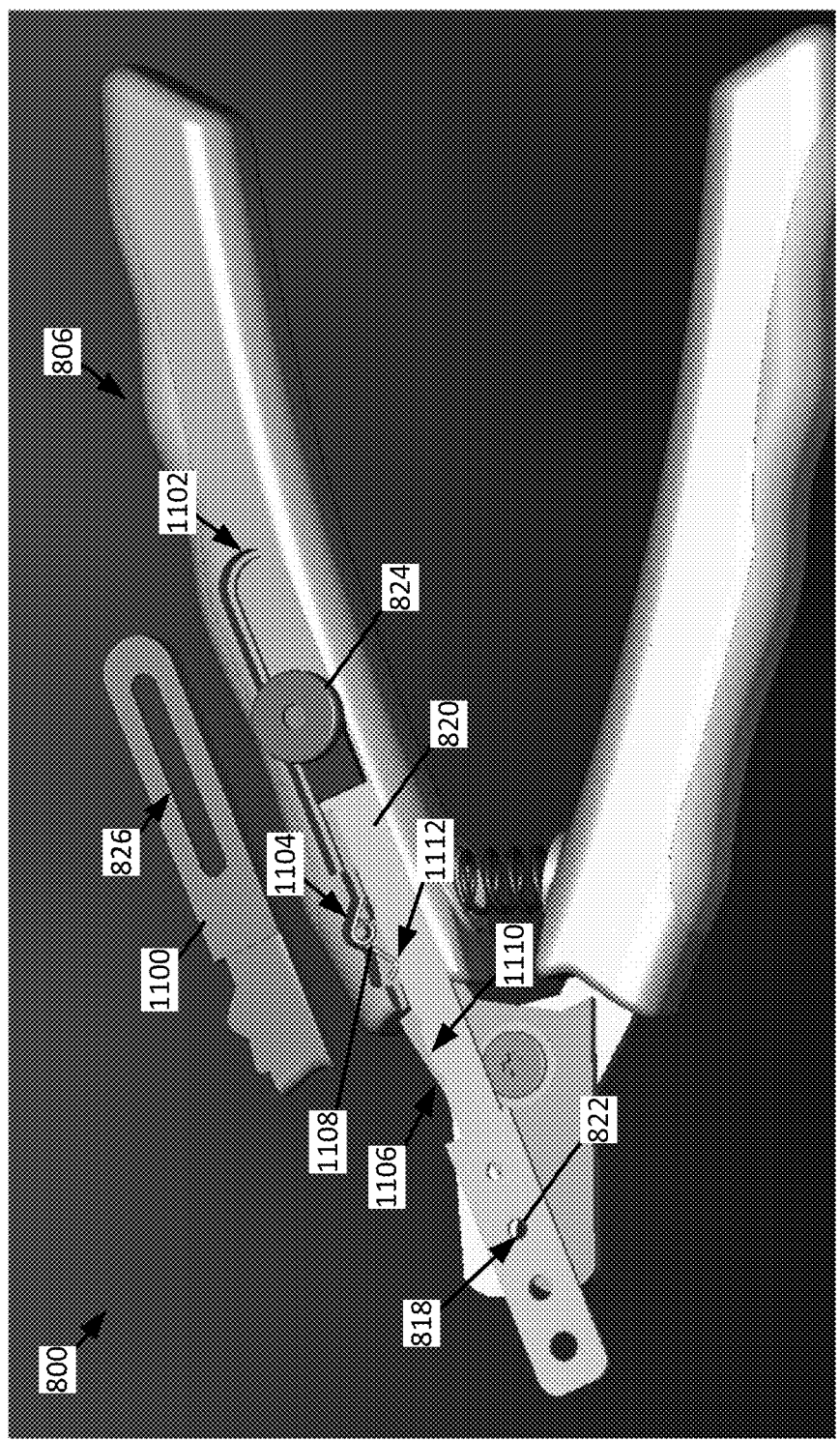
FIG. 11 shows an exploded view of the trimming shears of FIG. 8 in a pre-cut position, consistent with embodiments of the present disclosure.

FIG. 11 shows an exploded view of the trimming shears 800 in the pre-cut position. As shown, the slot 826 is defined in a plate 1100 that extends over a track 1102 defined in the first handle portion 806. In other words, when coupled to the first handle portion 806, the plate 1100 at least partially encloses the track 1102 such that the actuator 824 extends from the slot 826. The track 1102 is configured to slidably receive the guide 820 such that the guide 820 slides within the track 1102 in response to movement of the actuator 824 within the slot 826. An indexer 1104 can be coupled to the first body 802. For example, the indexer 1104 can be coupled to the first handle portion 806 such that at least a portion of the indexer 1104 extends within the track 1102. The indexer 1104 is configured to retain the guide 820 at one or more predetermined positions relative to the cutting region 818. At least one of the one or more predetermined positions corresponds to a position in which a respective one of the apertures 822 is aligned with the cutting region 818.

As shown, the indexer 1104 is configured to engage with a respective one of a plurality of recesses 1106 defined in the guide 820. The indexer 1104 includes a spring arm 1108 configured to move between a retention position and an adjusting position. As such, in some instances, the indexer 1104 may be spring (e.g., a torsion spring). When in the retention position, at least a portion of the spring arm 1108 is received within a respective recess 1106 defined within the guide 820. The spring arm 1108 is urged towards an adjusting position in response to the actuator 824 urging the guide 820 to slide within the track 1102. When in the adjusting position, the spring arm 1108 is out of engagement with a respective recess 1106 and slidably engages a transition surface 1110 of the guide 820 that extends from the respective recess 1106 (e.g., extends between immediately adjacent recesses 1106).

The spring arm 1108 can include an engagement region 1112 that is configured to be received within the recesses 1106. The engagement region may have a shape that generally corresponds to a shape of the recesses 1106. The shape of the engagement region 1112 and the recesses 1106 may be configured to cooperate such that the spring arm 1108 can be caused to transition from the retention position to the adjusting position in response to the actuator 824 being exposed to a predetermined force exerted along an axis that extends generally along the track 1102. For example, the engagement region 1112 and recesses 1106 may have a triangular shape, an arcuate shape, and/or any other shape configured such that the spring arm 1108 is transitioned from the retention position to the adjusting position in response to the actuator 824 being exposed to a predetermined force exerted along an axis that extends generally along the track 1102.

As shown, the guide 820 includes at least four recesses 1106 and at least four apertures 822, wherein each recess 1106 corresponds to a respective aperture 822 such that, when the engagement region 1112 is received within a corresponding recess 1106, the respective aperture 822 is aligned with the cutting region 818. While the guide 820 is shown as having four recesses 1106, the guide 820 may have any number of recesses 1106. For example, the guide 820 may have at least two recesses 1106, at least three recesses 1106, or any other number of recesses 1106.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. Trimming shears to cut one or more claws of an animal comprising:
    a first body having a first handle portion and a first cutting portion;
    a second body having a second handle portion and a second cutting portion;
    a cutting region defined between the first cutting portion and the second cutting portion;
    the first body and the second body pivotally coupled such that at least one of the first body and the second body pivot relative to each other in a common plane;
    a guide slidably coupled to the first body and slidable linearly along a sliding axis that extends substantially parallel to the common plane, the guide having
        a top surface substantially parallel to the common plane;
        a bottom surface opposite the top surface, the bottom surface substantially parallel to the common plane; and
        a plurality of apertures extending through the guide from the top surface to the bottom surface, each aperture of the plurality of apertures having a different size to receive the one or more claws.

2. The trimming shears of claim 1, wherein the first handle portion has a track within which the guide is disposed and slidable linearly along the sliding axis.

3. The trimming shears of claim 2, further comprising a plate which overlies the guide within the track.

4. The trimming shears of claim 3, further comprising an actuator to move the guide along the track;
    wherein the actuator contacts the guide within the track and extends through a slot in the plate; and
    wherein movement of the actuator within the slot corresponds to movement of the guide along the track.

5. The trimming shears of claim 1 further comprising an indexer coupled to the first body, the indexer operable with the guide to retain the guide in a plurality of predetermined retention positions relative to the first body.

6. The trimming shears of claim 5, wherein the indexer has a guide engagement region;
    wherein the guide has a plurality of recesses; and
    wherein the guide engagement region of the indexer is disposable in a different one of the plurality of recesses at each retention position of the plurality of retention positions, respectively.

7. Trimming shears to cut one or more claws of an animal comprising:
    a first body having a first handle portion and a first cutting portion;
    a second body having a second handle portion and a second cutting portion;
    a cutting region defined between the first cutting portion and the second cutting portion;
    the first body and the second body pivotally coupled such that at least one of the first cutting portion and the second cutting portion pivot relative to each other about a pivot axis;
    a guide coupled to the first body and movable along a longitudinal extent of the first handle portion, the guide having a plurality of apertures extending through the guide, each aperture of the plurality of apertures having a different size to receive the one or more claws; and
    the cutting region configured to receive a claw of the one or more claws after the claw extends through one of the plurality of apertures, and cut the claw in response to at least one of the first cutting portion and the second cutting portion pivoted towards each other about the pivot axis.

8. The trimming shears of claim 7, wherein the guide is movable along the longitudinal extent of the first handle portion within the first handle portion.

9. The trimming shears of claim 8, wherein the first handle portion has a track within which the guide is disposed and movable along the longitudinal extent of the first handle portion.

10. The trimming shears of claim 9, further comprising a plate which overlies the guide within the track.

11. The trimming shears of claim 10, further comprising an actuator to move the guide along the track;
    wherein the actuator contacts the guide within the track and extends through a slot in the plate; and
    wherein movement of the actuator within the slot corresponds to movement of the guide along the track.

12. The trimming shears of claim 7 further comprising an indexer coupled to the first body, the indexer operable with the guide to retain the guide in a plurality of predetermined retention positions relative to the first body.

13. The trimming shears of claim 12, wherein the indexer has a guide engagement region;
    wherein the guide has a plurality of recesses; and
    wherein the guide engagement region of the indexer is disposable in a different one of the plurality of recesses at each retention position of the plurality of retention positions, respectively.

14. The trimming shears of claim 12, wherein each retention position of the plurality of predetermined retention positions arranges one of the plurality of the apertures of the guide, respectively, with a first cutting portion cutting edge of the first cutting portion and a second cutting portion cutting edge of the second cutting portion such that the first cutting portion cutting edge and the second cutting portion cutting edge are operable to cut the claw of the one or more claws when disposed in the one of the plurality of apertures of the guide.

15. The trimming shears of claim 7, wherein the different size of each aperture of the plurality of apertures accommodates a different claw size of the one or more claws, respectively.

16. The trimming shears of claim 7, wherein each aperture of the plurality of apertures has a circular shape.

17. The trimming shears of claim 7, wherein at least one aperture of the plurality of apertures has a non-circular shape.

18. The trimming shears of claim 7, wherein:
the first cutting portion has a first cutting portion cutting edge;
the second cutting portion has a second cutting portion cutting edge;
the first cutting portion cutting edge is arcuate; and
the second cutting portion cutting edge is arcuate.

19. The trimming shears of claim 7, wherein:
the guide is movable along the longitudinal extent of the first handle portion such that each aperture of the plurality of apertures is alignable with the cutting region to cut the claw.

20. The trimming shears of claim 7 wherein:
the first body and the second body transition from a pre-cut position to a cut position, and vice-versa, in response to pivoting about the pivot axis; and
a biasing mechanism urges at least one of the first body and the second body towards the pre-cut position.

\* \* \* \* \*